(No Model.)

H. SIEBEN & W. F. JACUBZICK.
VEHICLE WHEEL.

No. 351,661. Patented Oct. 26, 1886.

WITNESSES
F. L. Durand
Edward Stanton

INVENTORS:
Henry Sieben
Wm F. Jacubzick
By Louis Bagger & Co. Attorneys.

UNITED STATES PATENT OFFICE.

HENRY SIEBEN AND WILLIAM FREDERICK JACUBZICK, OF OMAHA, NEBR.

VEHICLE-WHEEL.

SPECIFICATION forming part of Letters Patent No. 351,661, dated October 26, 1886.

Application filed August 13, 1886. Serial No. 210,800. (No model.)

*To all whom it may concern:*

Be it known that we, HENRY SIEBEN and WILLIAM FREDERICK JACUBZICK, both residents of Omaha, in the county of Douglas and State of Nebraska, have invented certain new and useful Improvements in Wheels for Vehicles; and we do hereby declare that the following is a full, clear, and exact description of the invention, which will enable others skilled in the art to which it appertains to make and use the same, reference being had to the accompanying drawings, which form a part of this specification, and in which—

Figure 1:
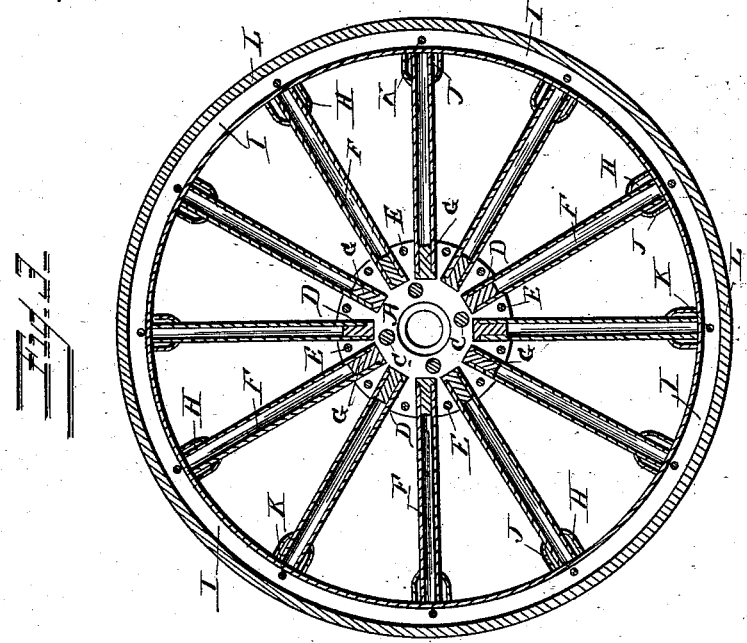
Figure 2:
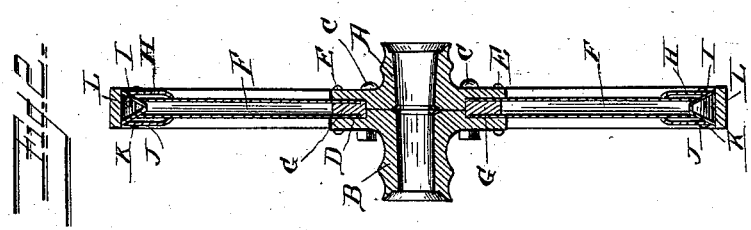
Figure 3:
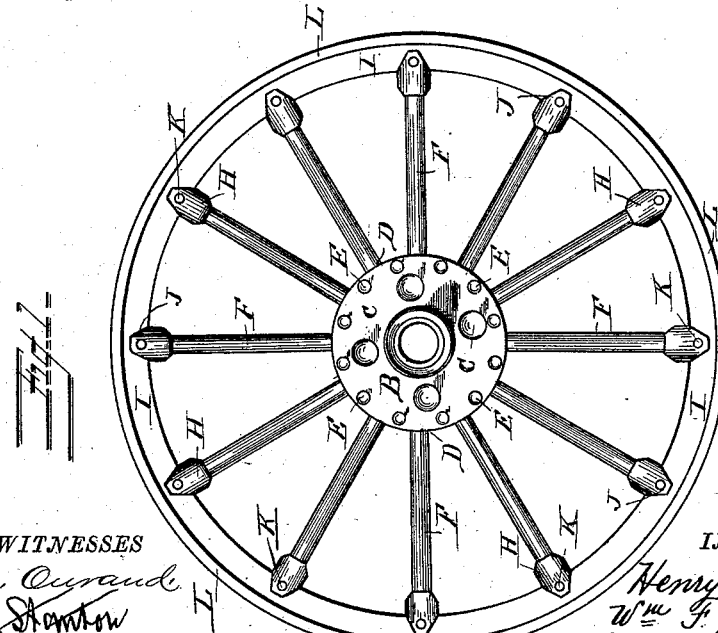

Figure 1 is a side view of our improved vehicle-wheel. Fig. 2 is a sectional view taken through the axle of the wheel, and Fig. 3 is a similar view taken at a right angle to the former.

Similar letters of reference indicate corresponding parts in all the figures.

Our invention has relation to metallic vehicle-wheels; and it consists in the improved construction and combination of parts of a wheel having a metallic hub formed in two halves, forming sockets for tubular spokes, to the ends of which a longitudinally-bent felly is secured, as hereinafter more fully described and claimed.

In the accompanying drawings, the letter A indicates the inner half of the hub, and B indicates the outer half, which halves are united with their enlarged portions by means of bolts or rivets C, passing through the enlarged portions of the halves. The facing sides of these enlarged portions are formed with radiating semi-cylindrical sockets D, registering with each other, and rivets E pass through the outer portions of the enlargements between the sockets. The inner ends of tubular spokes F fit firmly in these sockets, and have shouldered plugs G, of wood, driven into them, bearing against the inner ends of the sockets, and the outer ends of the spokes have enlarged rings H or collars secured to them. The outer ends of these collars are cut out to form V-shaped notches J, and the felly I, which is formed by a strip of metal bent to be V-shaped in cross-section, fits with its doubled portion in the said notches, the lips at the sides of the notches being riveted to the felly with rivets K.

The tire L is shrunk upon the felly in the usual manner, retaining all the several portions of the wheel in their proper positions, all the spokes being fitted firmly and snugly in the sockets of the hub, the two halves of the hub being drawn tightly upon the ends of the spokes, and the tire being shrunk tightly upon the felly will hold the parts of the wheel firmly together.

The wooden plugs inserted in the inner ends of the spokes will serve to strengthen the hollow ends of the spokes against the strain of the two halves of the hub, being drawn together by their bolts and rivets, and at the same time the said wooden plugs will also serve to cushion jars in the rigid metallic spokes, and to deaden the noise which otherwise would be created by a metallic wheel rolling over uneven ground, and the plugs will be so inclosed in the ends of the spokes and by the sockets that they will not be injured by moisture or other atmospheric influences, which might otherwise injure the wheel by rendering the plugs unfit for use, while the remaining parts of the wheel were not injured or worn.

Having thus described our invention, we claim and desire to secure by Letters Patent of the United States—

In a vehicle-wheel, the combination, with the two parts A and B, which constitute the hub, and in which are formed the radiating sockets D, of the bolts C, arranged near the axis of the hub, the rivets E, arranged near the periphery of the same, the tubular spokes, and the shouldered plugs fitting into the inner ends of said spokes and bearing against the inner ends of said sockets.

In testimony that we claim the foregoing as our own we have hereunto affixed our signatures in presence of two witnesses.

HENRY SIEBEN.
WILLIAM FREDERICK JACUBZICK.

Witnesses:
CHARLES W. WALLSTROM,
CHARLIS PETERSON.